(12) United States Patent
Mizusawa

(10) Patent No.: US 10,302,762 B2
(45) Date of Patent: May 28, 2019

(54) ELECTRIC APPARATUS WITH FOREIGN MATTER DETECTION PANEL

(71) Applicant: FANUC CORPORATION, Yamanashi (JP)

(72) Inventor: Kazuyasu Mizusawa, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/408,972

(22) Filed: Jan. 18, 2017

(65) Prior Publication Data

US 2017/0205508 A1 Jul. 20, 2017

(30) Foreign Application Priority Data

Jan. 19, 2016 (JP) .................................. 2016-008046

(51) Int. Cl.
| | |
|---|---|
| *G01S 15/04* | (2006.01) |
| *B23Q 1/00* | (2006.01) |
| *B23Q 11/12* | (2006.01) |
| *B23Q 11/08* | (2006.01) |
| *B23Q 17/00* | (2006.01) |
| *G06F 3/043* | (2006.01) |
| *G01V 1/00* | (2006.01) |

(52) U.S. Cl.
CPC ............ *G01S 15/04* (2013.01); *B23Q 1/0045* (2013.01); *B23Q 11/0891* (2013.01); *B23Q 11/126* (2013.01); *B23Q 17/007* (2013.01); *G01V 1/001* (2013.01); *G06F 3/043* (2013.01); *G06F 2203/04103* (2013.01)

(58) Field of Classification Search
CPC .................................. G01S 15/04; G01S 15/02
See application file for complete search history.

(56) References Cited

U.S. PATENT DOCUMENTS

| | | | | |
|---|---|---|---|---|
| 5,412,221 A | * | 5/1995 | Curtis | .................... G01N 15/06 250/573 |
| 6,392,167 B1 | * | 5/2002 | Nakagawa | ............. G06F 3/0436 178/18.01 |
| 2014/0305221 A1 | * | 10/2014 | Kogai | .................. G01N 29/022 73/645 |

FOREIGN PATENT DOCUMENTS

| | | | |
|---|---|---|---|
| EP | 1818790 A2 | 8/2007 | |
| JP | 61-239322 A | 10/1986 | |
| JP | 08030377 A | 2/1996 | |
| JP | 10-239374 A | 9/1998 | |
| JP | 2001241831 A | 9/2001 | |
| JP | 2006098543 * | 4/2006 | ............. G03B 21/14 |
| JP | 2009002677 A | 1/2009 | |

(Continued)

*Primary Examiner* — Hongmin Fan
(74) *Attorney, Agent, or Firm* — RatnerPrestia

(57) ABSTRACT

An electric apparatus comprises a foreign matter detection panel arranged inside a casing and configured to detect contact of foreign matter. The electric apparatus comprises a detection controller which receives a signal outputted from the foreign matter detection panel and judges whether or not foreign matter is in contact with a surface of the foreign matter detection panel. The foreign matter detection panel includes a substrate, a transmitter which generates a surface acoustic wave on the substrate. The foreign matter detection panel includes a reflection array which reflects the surface acoustic wave in a predetermined direction and a receiver which receives the surface acoustic wave which has propagated along the substrate.

3 Claims, 3 Drawing Sheets

(56) References Cited

FOREIGN PATENT DOCUMENTS

| | | | |
|---|---|---|---|
| JP | 2011197288 | A | 10/2011 |
| JP | 2012123662 | A | 6/2012 |

\* cited by examiner

ELECTRIC APPARATUS WITH FOREIGN MATTER DETECTION PANEL

BACKGROUND OF THE INVENTION

1. Field of the Invention

The present invention relates to an electric apparatus with a foreign matter detection panel.

2. Description of the Related Art

A manufacturing equipment such as a machine tool, a robot, and a coating machine is installed in the factory and the like, where products are manufactured. The manufacturing equipment comprises an electric motor for moving a predetermined part, and an electric apparatus for driving the electric motor. For example, the machine tool comprises a motor for rotating a tool or moving a work, a servo amplifier for driving the motor, and a numerical control apparatus which controls the servo amplifier.

Inside the factory, foreign matter such as dust and liquid may be suspended in the air. For example, cutting fluid for cooling and lubrication of the work is often used for processing with the machine tool. A door is provided to a processing chamber where the work is processed. When the door is opened, splashes or mist of the cutting fluid may be emitted to the outside of the machine tool, instead of remaining inside the machine tool. In addition, metal dust produced during the processing may be emitted to the outside of the machine tool.

An electric component such as the servo amplifier and the numerical control apparatus is installed inside a sealed casing. However, when a door of the casing is opened, a foreign matter suspended in the air may intrude into the inside of the casing. Otherwise, when the casing is not completely sealed, the foreign matter intrudes into the inside of the casing.

Japanese Unexamined Patent Publication No. 10-239374A discloses an insulation deterioration detection device which detects insulation deterioration in a printed circuit board. It is disclosed that electrodes are provided all over the printed circuit board in the insulation deterioration detection device, so as to immediately detect the insulation deterioration when the deterioration takes place at least at one location of the printed circuit board.

Japanese Unexamined Patent Publication No. 61-239322A discloses a touch panel device employed in a display device. This document discloses a technique of identifying a coordinate of a position pressed by a person with a finger, utilizing a surface acoustic wave.

SUMMARY OF INVENTION

When the mist of the cutting fluid or dust intrudes into the inside of the casing in which the electric component is arranged, the cutting fluid or the dust sticks to the electric component such as the servo amplifier and the numerical control apparatus. As result, the electric component may malfunction or fail. For example, when the foreign matter sticks to the printed circuit board, electric circuits formed on the printed circuit board may be corroded, which may lead to malfunction or failure.

A device for detecting a foreign matter according to a conventional technique includes, for example, a wiring pattern formed on the surface of the printed circuit board. When the foreign matter such as cutting fluid sticks to the printed circuit board, the impedance of the wiring changes. Then the sticking of the foreign matter is detected on the basis of the change in impedance. Another device for detecting the foreign matter comprises a humidity sensor for detecting intrusion of liquid, and detects the foreign matter on the basis of a change in humidity.

However, in the device including the wiring pattern formed on the surface of the printed circuit board, when the wiring for detection itself is corroded because of the sticking of the foreign matter, the printed circuit board has to be replaced even though the other electric component arranged on the printed circuit board remains normal. In the method of utilizing the humidity sensor, it is difficult to detect a solid foreign matter. In the method of utilizing the humidity sensor, in addition, it is difficult to detect the foreign matter in such a case that a liquid foreign matter drops on the electric component without incurring a change in humidity. For example, when the cutting fluid stuck to a wall surface of a cabinet drops, the detection is difficult.

An electric apparatus according to the present invention comprises an electric component arranged inside a casing, and a foreign matter detection panel arranged inside the casing and configured to detect contact of foreign matter. The electric apparatus comprises a detection controller which receives a signal outputted from the foreign matter detection panel and judges whether or not the foreign matter is in contact with a surface of the foreign matter detection panel, and a communication device which transmits detection information of the foreign matter judged by the detection controller to an external device. The foreign matter detection panel comprises a substrate, and a transmitter which generates a surface acoustic wave on the substrate. The foreign matter detection panel includes a reflection array which reflects the surface acoustic wave in a predetermined direction and a receiver which receives the surface acoustic wave which has propagated along the substrate.

In the invention described above, the foreign matter detection panel may be arranged on a bottom surface of the casing.

In the invention described above, a fan which supplies air for cooling the electric component may be provided, and the foreign matter detection panel may be arranged so as to cause the air blown by the fan to collide with a foreign matter detection region defined on the substrate.

DETAILED DESCRIPTION

Referring to FIG. 1 to FIG. 5, an electric apparatus according to an embodiment will be described. In the present embodiment, the electric apparatus is exemplified by a power panel attached to a machine tool.

Figure 1:
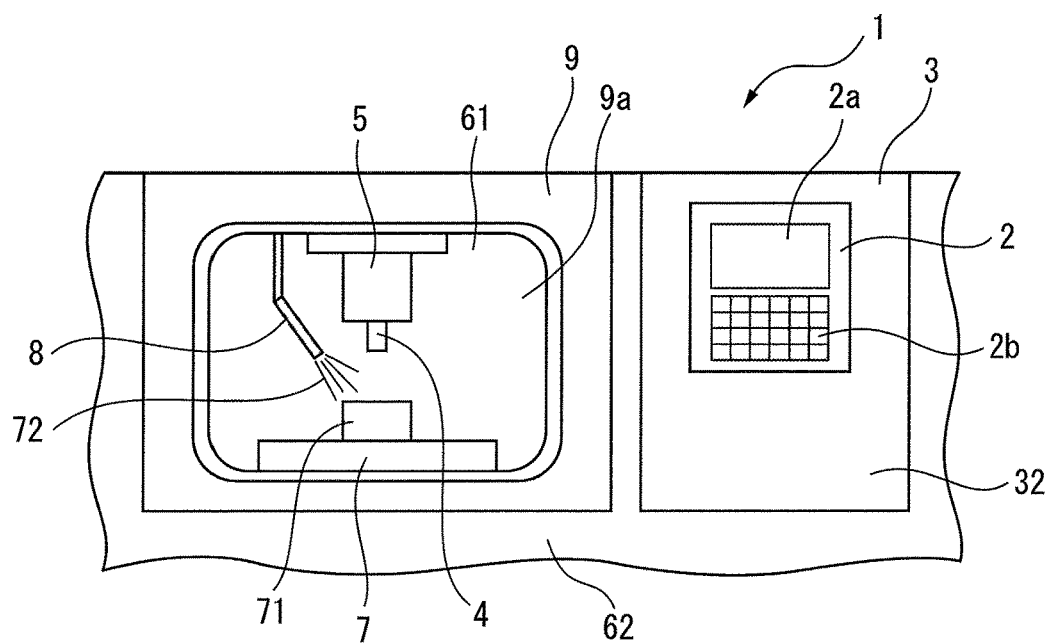
FIG. 1 is a schematic front view illustrating a main part of a machine tool according to an embodiment.

FIG. 1 shows a schematic front view of a main part of the machine tool according to the present embodiment. The machine tool 1 according to the present embodiment is of a numerical control type. The machine tool 1 is configured to change a relative position of a tool 4 with respect to a work 71 during the processing, to thereby process the work 71 into a desired shape.

The machine tool 1 comprises a spindle head 5 which supports the tool 4. The machine tool 1 comprises a table 7 on which the work 71 is fixed. The machine tool 1 comprises a numerical control apparatus and a drive device which drives the structural member. The drive device according to the present embodiment includes a plurality of motors for moving the table 7 and the spindle head 5 in predetermined directions. When at least one of the spindle head 5 and the table 7 is moved, the relative position of the tool 4 with respect to the work 71 is changed. In addition, the drive device includes a motor which rotates the spindle to which the tool 4 is attached.

The numerical control apparatus includes an arithmetic processing unit having a CPU (central processing unit), a RAM (random access memory), a ROM (read only memory), and the like connected to each other via a bus. The numerical control apparatus issues instructions in accordance with a predetermined operation program. The drive device drives the components in accordance with the instruction from the numerical control apparatus.

The machine tool 1 according to the present embodiment comprises a cutting fluid supplying device which supplies cutting fluid 72 to the part in which the tool 4 is in contact with the work 71 when the work 71 is processed. The cutting fluid supplying device includes a nozzle 8 through which the cutting fluid 72 is ejected. The cutting fluid 72 may also be referred to as coolant. The cutting fluid 72 is supplied in order to reduce friction between the tool 4 and the work 71. Otherwise, the cutting fluid 72 is supplied in order to cool the tool 4 or the work 71.

The machine tool 1 includes a processing chamber 61 enclosing a space surrounded by a frame body 62. The table 7, the spindle head 5, and the nozzle 8 are arranged inside the processing chamber 61. The frame body 62 includes a door 9. In the door 9, a window part 9a formed of a transparent material such as glass is formed so as to enable the state of the processing chamber 61 to be confirmed during the processing period of the work 71. The door 9 is configured to be opened and closed. When the door 9 is opened, the work 71 or the tool 4 can be replaced, and the spindle head 5 or other components can be inspected. When the work 71 is processed, the door 9 is closed. The processing chamber 61 according to the present embodiment forms a sealed space when the door 9 is closed.

The machine tool 1 according to the present embodiment comprises a power panel 3 serving as the electric apparatus. An operation panel 2 for operating the machine tool 1 is arranged in front of the power panel 3 according to the present embodiment. The operation panel 2 according to the present embodiment includes a display part 2a which displays information regarding the processing by the machine tool 1, and an input part 2b having a keyboard and the like.

Figure 2:
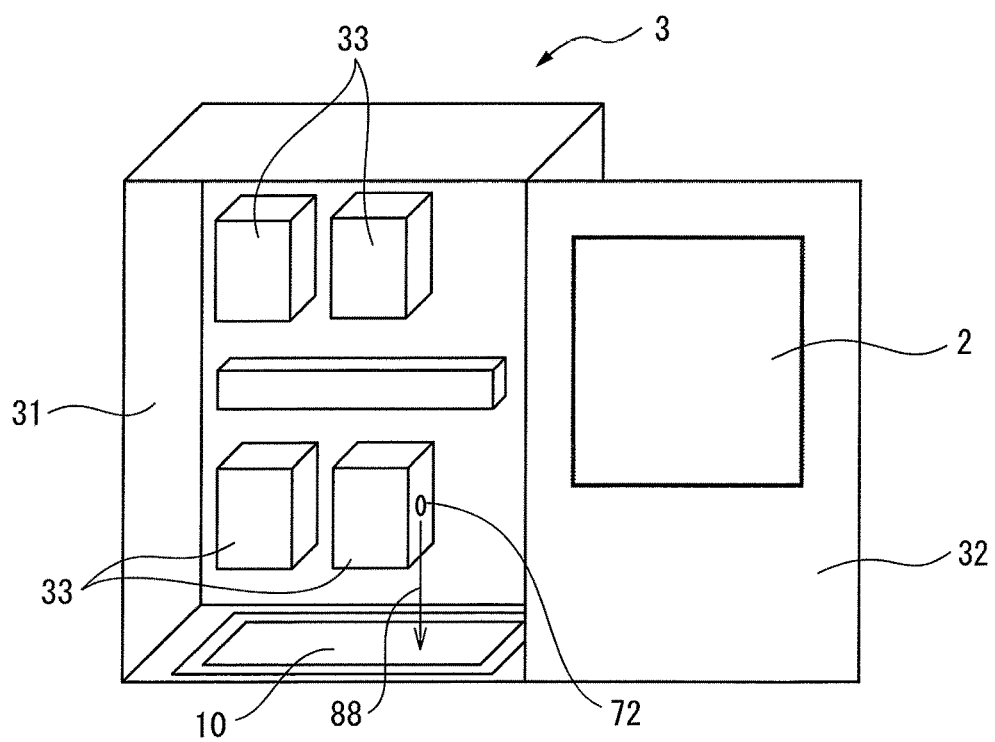
FIG. 2 is a schematic perspective view illustrating a power panel according to the embodiment.

FIG. 2 shows a schematic perspective view illustrating the power panel according to the present embodiment. Referring to FIG. 1 and FIG. 2, the power panel 3 comprises a casing 31. The casing 31 is formed in a box shape. The casing 31 includes a door 32 arranged on a front face. The door 32 is configured to be opened and closed. The operation panel 2 is fixed to the door 32. Inside the casing 31, a servo amplifier 33 serving as the electric component is arranged. The servo amplifier 33 receives a control signal from the numerical control apparatus. The servo amplifier 33 supplies electricity to the motor which operates the structural member, on the basis of the received control signal. The servo amplifier 33 according to the present embodiment is fixed to a side face of the casing 31.

The electric component provided in the electric apparatus may include, without limitation to the servo amplifier, a desired electric component which may fail or deteriorate due to adhesion of the foreign matter. For example, the electric component may include, other than the servo amplifier, a circuit breaker, a relay, an IO (input/output) device which transmits the control signal from the numerical control apparatus to a predetermined electric component and transmits a signal from the predetermined electric component to the numerical control apparatus, and a main body of the numerical control apparatus in which the CPU and the like are arranged.

The power panel 3 according to the present embodiment comprises a foreign matter detection panel 10 arranged inside the casing 31. The foreign matter detection panel 10 detects contact of the foreign matter. In the power panel 3, the foreign matter detection panel 10 is arranged on an inner bottom surface of the casing 31. The foreign matter detection panel 10 is formed so as to substantially cover the entirety of the inner bottom surface of the casing 31.

Figure 3:
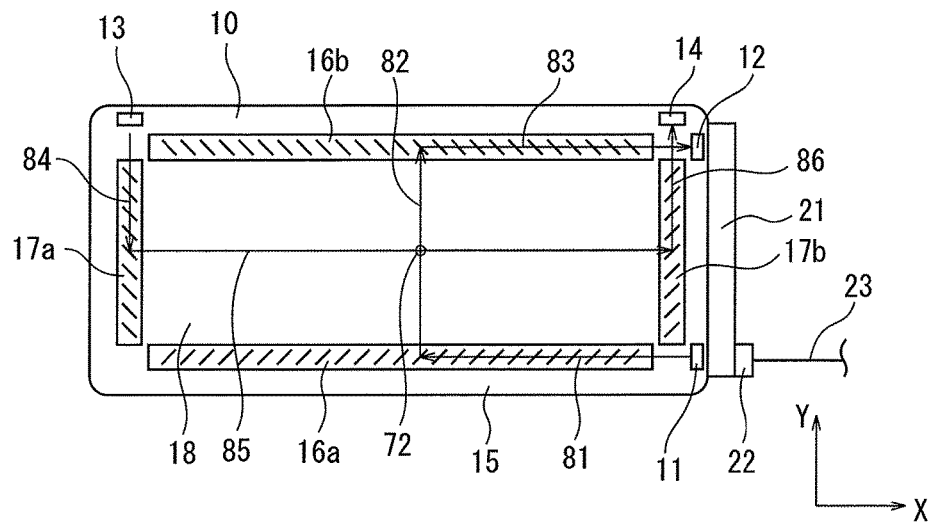
FIG. 3 is a schematic plan view illustrating a foreign matter detection panel and a detection controller according to the embodiment.

FIG. 3 shows a schematic plan view of the foreign matter detection panel and the detection controller according to the present embodiment. The foreign matter detection panel 10 according to the present embodiment detects contact of the foreign matter utilizing a surface acoustic wave (SAW) method. The surface acoustic wave method according to the present embodiment is an ultrasonic surface acoustic wave method. The foreign matter detection panel 10 may be constituted of a panel which detects contact, such as the panel included in a touch panel which employs the surface acoustic wave method utilized in a display device or the like. A substrate 15 to be subsequently described does not have to be transparent but may be opaque. In addition, it is not necessary to provide a panel, for example, a liquid crystal panel for displaying an image.

The foreign matter detection panel 10 comprises the substrate 15. The substrate 15 may be any desired type of substrate in which the surface acoustic wave can propagate. The substrate 15 may be a plate-shaped material formed of a resin, glass, or the like. The substrate 15 according to the present embodiment is formed in a rectangular shape in a plan view.

In FIG. 3, an X-axis direction and a Y-axis direction are designated for the purpose of explanation. The foreign matter detection panel 10 comprises transmitters 11 and 13 which generate a surface acoustic wave on the substrate 15. The transmitters 11 and 13 may each be referred to as a transmitting side transducer. The foreign matter detection panel 10 comprises reflection arrays 16a, 16b, 17a, and 17b that each reflect the surface acoustic wave in a predetermined direction, and receivers 12 and 14 that each receive the surface acoustic wave which has propagated along the substrate 15. The receivers 12 and 14 may each be referred to as a receiving side transducer.

The foreign matter detection panel 10 according to the present embodiment includes first transmitter 11 for generating the surface acoustic wave which proceeds in the Y-axis direction, first reflection arrays 16a and 16b, and first receiver 12. The foreign matter detection panel 10 also includes second transmitter 13 for generating the surface acoustic wave which proceeds in the X-axis direction, second reflection arrays 17a and 17b, and second receiver 14.

The first reflection arrays 16a and 16b, and the second reflection arrays 17a and 17b are arranged along the edge portion of the substrate 15. The first reflection arrays 16a and 16b, and the second reflection arrays 17a and 17b each include a reflection part formed so as to extend in a direction inclined by 45° with respect to a direction in which the incident surface acoustic wave proceeds. The reflection parts are formed at regular intervals from each other. Such a plurality of reflection parts constitutes a reflection pattern. The foreign matter detection region where contact of the foreign matter can be detected is defined on the substrate. In the present embodiment, the region between the first reflection arrays 16a and 16b and between the second reflection arrays 17a and 17b is defined as a foreign matter detection region 18.

The first transmitter 11 transmits the surface acoustic wave as indicated by an arrow 81. The surface acoustic wave is reflected by the reflection pattern of the first reflection array 16a so as to change the travel direction by 90°. The surface acoustic wave proceeds toward the opposite first reflection array 16b as indicated by an arrow 82. The surface acoustic wave is reflected by the reflection pattern of the first reflection array 16b so as to change the travel direction by 90°. The surface acoustic wave proceeds as indicated by an arrow 83 and is received by the first receiver 12.

Likewise, the second transmitter 13 transmits a surface acoustic wave as indicated by an arrow 84. The surface acoustic wave changes the travel direction by 90° at the second reflection array 17a, and then proceeds as indicated by an arrow 85. The surface acoustic wave changes the travel direction by 90° at the second reflection array 17b, and then proceeds as indicated by an arrow 86. The surface acoustic wave is received by the second receiver 14.

Figure 4:
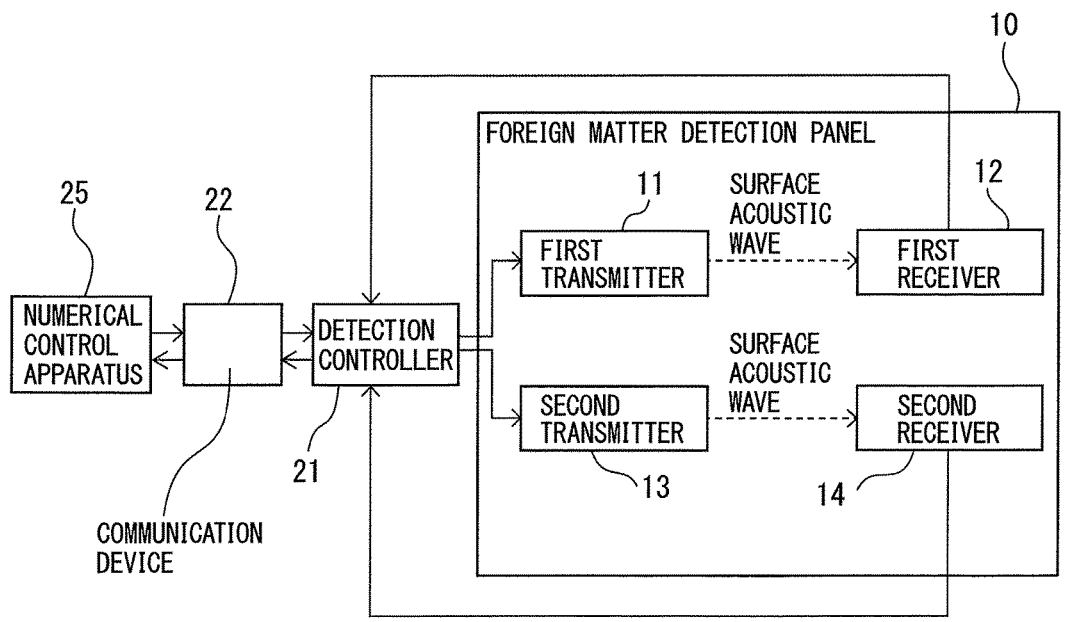
FIG. 4 is a block diagram representing a configuration of the foreign matter detection panel, the detection controller, and a numerical control apparatus according to the embodiment.

FIG. 4 shows a block diagram illustrating the foreign matter detection panel and the detection controller. Referring to FIG. 3 and FIG. 4, the power panel 3 comprises a detection controller 21. The detection controller 21 is constituted of an arithmetic processing unit including a CPU, a RAM, and the like. The detection controller 21 controls the transmitters 11 and 13 so as to adjust the waveform of the surface acoustic wave and the timing to generate the surface acoustic wave. The transmitters 11 and 13 oscillate, for example, pulses (ultrasonic wave) of a burst waveform having a predetermined peak intensity.

The detection controller 21 acquires the signal of the surface acoustic wave received by the receivers 12 and 14. In other words, the detection controller 21 receives the signal outputted from the foreign matter detection panel 10. The detection controller 21 judges whether or not the foreign matter is in contact with the foreign matter detection panel 10 on the basis of the signal of the surface acoustic wave. Further, the detection controller 21 according to the present embodiment can detect the position on the foreign matter detection panel 10 where the foreign matter is in contact with the foreign matter detection panel 10.

Referring to FIG. 1 and FIG. 2, a large amount of cutting fluid 72 is supplied to the portion of the work 71 being processed during the processing period of the work 71. In the processing period of the work 71, the cutting fluid 72 splashes inside the processing chamber 61. In addition, a large amount of mist of the cutting fluid 72 is present inside the processing chamber 61.

After the processing of the work 71 is finished, the mist of the cutting fluid 72 still remains inside the processing of chamber 61. When the door 9 is opened under such a condition, the mist inside the processing chamber 61 is emitted to the inside of the building in which the machine tool 1 is installed. In addition, the metal dust produced during the processing is emitted to the inside of the building. As a result, the dust and the mist of the cutting fluid float in the air in the building. When the door 32 of the power panel 3 is opened in the state in which the dust and the mist of the cutting fluid are floating in the air, the dust and the mist of the cutting fluid intrude into the inside of the casing 31. Then the dust and the mist of the cutting fluid stick to the wall surfaces of the casing 31 or the electric component such as the servo amplifier 33.

For example, when the mist of the cutting fluid 72 stuck to the surface of the servo amplifier 33 is accumulated, a liquid droplet is formed as illustrated in FIG. 2. When the liquid droplet grows bigger, the liquid droplet falls onto the surface of the foreign matter detection panel 10 as indicated by an arrow 88.

Referring to FIG. 3, when the foreign matter contacts the foreign matter detection panel 10, the advance of a surface acoustic wave propagating along the substrate 15 is disturbed. For example, the surface acoustic wave proceeding as indicated by the arrow 82 is attenuated by the cutting fluid 72 acting as the foreign matter. The intensity of the signal of the surface acoustic wave detected by the first receiver 12 becomes lower. In addition, the surface acoustic wave proceeding as indicated by the arrow 85 is attenuated by the cutting fluid 72. The detection controller 21 judges that the foreign matter has contacted the substrate 15, upon detecting the attenuation of the surface acoustic wave.

Further, the first receiver 12 detects the time at which the surface acoustic wave was first received and the time at which the intensity of the surface acoustic wave has been attenuated. Similarly, the second receiver 14 detects the time at which the surface acoustic wave was first received and the time at which the intensity of the surface acoustic wave has been attenuated. The detection controller 21 can calculate the position in the X-axis direction and the position in the Y-axis direction where the cutting fluid 72 has stuck, on the basis of the time at which the intensity of the surface acoustic wave has been attenuated. The foreign matter detection panel 10 can also detect the contact of solid foreign matter such as dust in the same way as the contact of liquid foreign matter.

Referring to FIG. 3 and FIG. 4, the power panel 3 comprises a communication device 22 for making communication between the detection controller 21 and an external device. The external device according to the present embodiment is a numerical control apparatus 25. The detection controller 21 receives the instruction from the numerical control apparatus 25 through a communication line 23 and the communication device 22 and performs the control for detecting the foreign matter.

The detection controller 21 transmits detection information of the foreign matter to the numerical control apparatus 25 through the communication device 22 and the communication line 23. In other words, the detection controller 21 transmits the information whether or not the foreign matter has been detected to the numerical control apparatus 25. When the foreign matter detection panel 10 detects the foreign matter, the numerical control apparatus 25 can cause, for example, the display part 2a of the operation panel 2 to display a warning to the effect that the foreign matter has been detected.

In addition, the foreign matter detection panel according to the present embodiment is formed so as to estimate the position where the foreign matter has stuck. The detection controller 21 transmits the position where the foreign matter has been detected to the numerical control apparatus 25. The numerical control apparatus 25 can cause, for example, the display part 2a of the operation panel 2 to display the position contacted by the foreign matter.

As described above, the power panel 3 according to the present embodiment can detect that the foreign matter has intruded into the inside of the casing 31 by the foreign matter detection panel 10. In addition, the power panel 3 can detect the intrusion of the foreign matter with a simple structure.

In the conventional technique of detecting the foreign matter by forming a wiring pattern on a printed circuit board, the foreign matter may be detected after corrosion has progressed. In such a case, the printed circuit board has to be replaced. In contrast, the foreign matter detection panel 10 according to the present embodiment can immediately detect the foreign matter once the foreign matter sticks. The foreign matter detection panel 10 can detect the intrusion of the foreign matter at an early stage. Therefore, the intrusion of the foreign matter can be detected before the electric component corrodes and fails. Further, after the detection of the foreign matter, the foreign matter detection panel 10 can be reused upon wiping off the surface of the substrate.

The foreign matter detection panel 10 according to the present embodiment can detect the intrusion of any selected foreign matter into the inside of the casing 31, other than the intrusion of the cutting fluid and dust. For example, an insect which has intruded into the building may enter into the inside of the power panel. In such a case, the intrusion of the foreign matter can be also detected when the insect contacts the foreign matter detection panel 10.

The foreign matter may intrude through various routes, other than the case where the door 32 is opened. For example, the foreign matter may intrude through an insertion port of a cable drawn into the power panel. When the casing is not sealed, the foreign matter may intrude through a gap formed in the casing. The foreign matter detection panel 10 according to the present embodiment can detect the intrusion of the foreign matter without depending on the intrusion route of the foreign matter.

Although the foreign matter detection panel 10 according to the present embodiment has a rectangular shape in a plan view, the foreign matter detection panel may be formed in any desired shape in a plan view. Therefore, the foreign matter detection panel may be formed, for example, in accordance with the shape of the casing.

The foreign matter detection panel 10 according to the present embodiment is arranged on the inner bottom surface of the casing 31. The foreign matter which has intruded into the inside of the casing is subjected to the action of gravity. The foreign matter falling down inside the casing 31 can be effectively detected. Here, it is preferable that the foreign matter detection panel 10 is formed in a large size so as to substantially cover the entirety of the inner bottom surface of the casing 31, when arranged on the bottom surface of the casing 31. Such the configuration suppresses a failure in detecting the foreign matter which has intruded into the casing 31.

The foreign matter detection panel 10 according to the present embodiment detects the position in the X-axis direction and the position in the Y-axis direction where the foreign matter has stuck. Therefore, the position where the foreign matter has fallen can be identified. When the foreign matter is liquid, for example, it is probable that the liquid has fallen from the component arranged right above the position where the foreign matter has been detected. Thus, the position where the foreign matter has stuck can be easily estimated. When the electric component is likely to fail or malfunction because of the foreign matter stuck thereto, a measure such as removing the liquid from the electric component can be taken.

The foreign matter detection panel does not have to be able to calculate the position contacted by the foreign matter. It suffices that the foreign matter detection panel can judge whether or not the foreign matter has made contact. In the present embodiment, for example, the second transmitter and the second receiver are provided in addition to the first transmitter and the first receiver, however, without limitation to such a configuration, it suffices that at least a pair of transmitter and receiver is provided. For example, the second transmitter, the second receiver, and the second reflection array may be excluded from the present embodiment.

Figure 5:
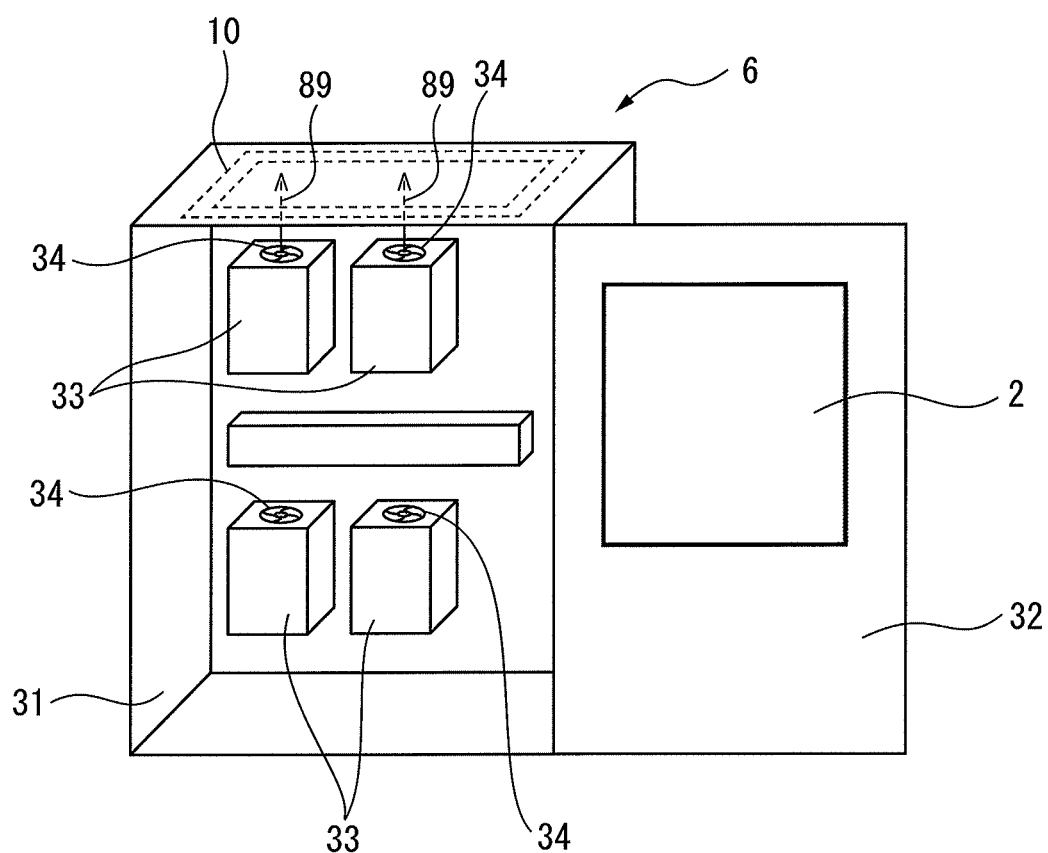
FIG. 5 is a schematic perspective view illustrating another power panel according to the embodiment.

FIG. 5 shows a schematic perspective view illustrating another power panel according to the present embodiment. In the electric apparatus in which the electric component is arranged, a fan which supplies air for cooling the electric component may be provided. The fan is arranged so as to generate airflow inside the casing. A servo amplifier 33 of a power panel 6 illustrated in FIG. 5 includes a fan 34. The fan 34 supplies cooling air into the inside of the servo amplifier 33. The fan 34 is arranged at the upper part of the servo amplifier 33. The fan 34 is configured to discharge air upward as indicated by an arrow 89.

The air blown by the fan 34 of the servo amplifier 33 arranged in the upper part of the casing 31 collides with the upper face of the casing 31. When the air inside the casing 31 contains the mist of the cutting fluid, the cutting fluid is liable to be deposited on the upper face of the casing 31. In other words, the cutting fluid is liable to be deposited in the part where the air blown by the fan 34 collides.

In the power panel 6 according to the present embodiment, the foreign matter detection panel 10 is arranged on the upper surface, out of the inner surfaces of the casing 31. The foreign matter detection panel 10 is arranged so as to oppose the air outlet of the fan 34. In particular, the foreign matter detection panel 10 is arranged so that the air blown by the fan 34 collides with the foreign matter detection region 18 on the substrate 15. Adopting such a configuration allows detection of the intrusion of the foreign matter at an early stage.

The fan provided in the electric apparatus may be arranged at any desired position in the casing. The foreign matter detection panel may be arranged at any desired position so that the air blown by the fan collides with the foreign matter detection region on the substrate. In addition, although the foreign matter detection panel according to the present embodiment is fixed to the wall surface of the casing, the embodiment is not limited to this. For example, a support member which supports the foreign matter detection panel may be provided. In this case, the foreign matter detection panel may be also arranged so that the substrate is opposed to the air outlet of the fan.

Although the electric apparatus is exemplified by the power panel in the present embodiment, the embodiment is not limited to this. The present invention is applicable to any electric apparatus which includes the electric component which may fail, malfunction, or deteriorate due to adhesion of the foreign matter.

The electric apparatus according to the present invention can detect the intrusion of the foreign matter into the inside of the casing in which the electric component is arranged.

The configurations according to the foregoing embodiment may be combined as desired. In the respective drawings referred to above, the same or corresponding elements are given the same numeral. The foregoing embodiments are merely exemplary, and not intended to limit the present invention. Further, the embodiments contain variations thereof set forth in the claims.

The invention claimed is:

1. An electric apparatus comprising:
an electric component arranged inside a casing;
a foreign matter detection panel arranged inside the casing above or below the electric component, wherein in response to foreign matter detaching from the electric component and then contacting the foreign matter detection panel, the foreign matter detection panel detecting the contact of the foreign matter;
a detection controller which receives a signal outputted from the foreign matter detection panel and judges whether or not the foreign matter is in contact with a surface of the foreign matter detection panel; and
a communication device which transmits detection information of the foreign matter judged by the detection controller to an external device, wherein
the foreign matter detection panel includes:
a substrate,
a first transmitter which generates a first surface acoustic wave on the substrate,
a first reflection array which reflects the first surface acoustic wave in a first predetermined direction,
a first receiver which receives the first surface acoustic wave which has propagated along the substrate,
a second transmitter which generates a second surface acoustic wave on the substrate,
a second reflection array which reflects the second surface acoustic wave in a second predetermined direction, and
a second receiver which receives the second surface acoustic wave which has propagated along the substrate,
wherein the first predetermined direction is different from the second
predetermined direction,
wherein the detection controller determines a position of the foreign matter on the foreign matter detection panel based on the detected information, and estimates a position of the electric component within the casing where the foreign matter was attached prior to contacting the foreign matter detection panel.

2. The electric apparatus according to claim 1, wherein the foreign matter detection panel is arranged on a bottom surface of the casing.

3. The electric apparatus according to claim 1, further comprising a fan which supplies air for cooling the electric component, wherein
the foreign matter detection panel is arranged so as to cause the air blown by the fan to collide with a foreign matter detection region defined on the substrate.

* * * * *